(12) United States Patent
Fan et al.

(10) Patent No.: US 11,447,665 B2
(45) Date of Patent: Sep. 20, 2022

(54) ORGANOSILICON SYNTHETIC LEATHER AND PREPARATION METHOD THEREOF

(71) Applicant: GUANGZHOU XIBO CHEMICAL TECHNOLOGY CO., LTD., Guangdong (CN)

(72) Inventors: Dewen Fan, Guangdong (CN); Jiangqun Li, Guangdong (CN)

(73) Assignee: GUANGZHOU XIBO CHEMICAL TECHNOLOGY CO., LTD., Guangzhou (CN)

(*) Notice: Subject to any disclaimer, the term of this patent is extended or adjusted under 35 U.S.C. 154(b) by 721 days.

(21) Appl. No.: 16/479,922

(22) PCT Filed: Mar. 28, 2018

(86) PCT No.: PCT/CN2018/080796
§ 371 (c)(1),
(2) Date: Jul. 22, 2019

(87) PCT Pub. No.: WO2019/095605
PCT Pub. Date: May 23, 2019

(65) Prior Publication Data
US 2019/0390084 A1    Dec. 26, 2019

(30) Foreign Application Priority Data
Nov. 14, 2017   (CN) .......................... 201711124970.2

(51) Int. Cl.
| C09J 7/35 | (2018.01) |
| C09J 5/06 | (2006.01) |
| D06N 3/12 | (2006.01) |
| D06N 3/00 | (2006.01) |

(52) U.S. Cl.
CPC . C09J 7/35 (2018.01); C09J 5/06 (2013.01); D06N 3/0097 (2013.01); D06N 3/128 (2013.01); *C09J 2483/00* (2013.01); *D06N 2209/067* (2013.01); *D06N 2209/146* (2013.01); *D06N 2209/1685* (2013.01); *D06N 2211/28* (2013.01)

(58) Field of Classification Search
CPC . C09J 7/35; C09J 5/06; C09J 2483/00; D06N 3/128; D06N 3/0097; D06N 2211/28; D06N 2209/067; D06N 2209/146; D06N 2209/1685
See application file for complete search history.

(56) References Cited

U.S. PATENT DOCUMENTS

| 2008/0242176 A1* | 10/2008 | Jaeger ................. D06M 15/564 442/139 |
| 2014/0193353 A1* | 7/2014 | Tamura ................ A61K 9/0014 424/78.02 |

FOREIGN PATENT DOCUMENTS

| CN | 106367985 A | 2/2017 |
| CN | 106498759 A | 3/2017 |

OTHER PUBLICATIONS

English translation to Chinese Patent Application Publication No. 106498759 A to Zhang et al. (Year: 2017).*

* cited by examiner

*Primary Examiner* — Jeremy R Pierce

(57) ABSTRACT

The present invention relates to an organosilicon synthetic leather and a preparation method thereof. The organosilicon synthetic leather comprises a surface glue layer, a bottom glue layer, and a base layer which are overlapped sequentially. The preparation method comprises the steps of: mixing the main raw materials of the surface glue layer in a proper proportion to obtain a surface glue; mixing the main raw materials of the bottom glue layer in a proper proportion to obtain a bottom glue; coating and curing the surface glue on a release paper, coating the bottom glue on the cured surface glue to form the bottom glue layer, then compositing the bottom glue layer with the base layer and curing composited bottom glue layer, and striping the release paper to obtain the organosilicon synthetic leather. The inventive organosilicon synthetic leather has excellent safety, wear resistance, antifouling property and flame retardancy.

20 Claims, No Drawings

ORGANOSILICON SYNTHETIC LEATHER AND PREPARATION METHOD THEREOF

FIELD OF THE INVENTION

The invention relates to the field of synthetic leathers, in particular to an organosilicon synthetic leather and a preparation method thereof.

BACKGROUND OF THE INVENTION

Leather is a general term for a class of substances including real leather, PU synthetic leather, PVC artificial leather, etc., which are common in everyday life. Real leather has good breathability and moisture permeability. However, real leather is expensive; furthermore, mass killing is involved in order to obtain real leather, which is resisted by a large number of animal-loving people. PU synthetic leather has very good wear resistance, scratch resistance, and the like. However, its poor weather resistance, poor flame retardancy, and poor antifouling property limit its application in some industries. PVC artificial leather has good weather resistance, but with the migration of plasticizers contained therein, the surface of the PVC artificial leather begins to harden and becomes brittle after long-term use, and is peeled off in the end. Moreover, in traditional tanning industry, it is necessary to add various rubbing agents containing heavy metals during the processing of real leather; in the preparation process of PU synthetic leather, it is necessary to add chemical reagents, such as toluene, butanone, DMF, methyl ethyl ketone, cyclohexanone, and the like, to dilute resin; and it is necessary to use a large number of plasticizers in the PVC calendaring process to improve processing properties, etc. These heavy metals, chemically diluted resins and plasticizers constantly affect human health and the natural environment that we depend on.

Silicon, the most abundant element in nature, has very stable and safe chemical properties. Through a main chain composed of a —Si—O— basic unit and a side chain formed by silicon atoms connecting with various other organic groups, organosilicon materials have both the stability of inorganic substances and the elasticity and plasticity of organic substances. The organosilicon synthetic leather is produced by coating a layer of an organosilicon material on the surface of a woven or non-woven fabric by mechanical coating. The organosilicon synthetic leather has advantages in terms of safety, flame retardancy, weather resistance, and the like when compared with real leather, PU synthetic leather, PVC artificial leather, etc. Although the organosilicon synthetic leather has many advantages, its wear resistance is poor, its surface is not smooth, and even its antifouling property is not satisfactory.

It is proposed to produce synthetic leather by using organosilicon polyurethane resin as a modifier in a Chinese Patent (Publication No.: CN106367985A, publication date: Feb. 1, 2017). The synthetic leather has good biocompatibility of organosilicons; meanwhile, it also overcomes the disadvantages of poor water resistance, poor antifouling property, poor flame retardancy, and the like, in polyurethane. However, the adhesion of a transfer film and an impregnated cloth base needs 24 to 36 hours to ripen in this invention, which is too long and affects production efficiency.

It is proposed to improve the wear resistance of an organosilicon synthetic leather using white corundum, silicon carbide or graphene with a particle size of 400 to 600 meshes in a Chinese patent (publication number: CN106498759A, publication date: Mar. 15, 2017). Although the wear resistance is improved to a certain extent, the particle diameter is too large, which affects the mechanical properties of a surface glue layer. In addition, these powders exhibit certain colors, which brings certain difficulties to the leather coloring process.

SUMMARY OF THE INVENTION

In view of the above, the present invention provides an organosilicon synthetic leather which is safe and has excellent wear resistance, antifouling property, and flame retardancy.

The detailed technical solutions are as follows:

An organosilicon synthetic leather, wherein the organosilicon synthetic leather comprises a base layer, a bottom glue layer, and a surface glue layer, which are stacked sequentially, the surface glue layer is prepared from the following main raw materials in parts by mass:
an organopolysiloxane, 100 parts,
an organic hydrogenated polysiloxane, 0.1 to 10 parts,
a vinyl MTQ silicon resin, 1 to 60 parts,
a spherical vinyl MQ silicon resin, 10 to 100 parts,
a platinum catalyst, 0.01 to 5 parts,
an inhibitor, 0.01 to 2 parts,
a filler, 1 to 60 parts, and
a dye paste, 0 to 10 parts;

the bottom glue layer is prepared from the following main raw materials in parts by mass:
an organopolysiloxane, 100 parts,
an organic hydrogenated polysiloxane, 0.1 to 10 parts,
a vinyl MTQ silicon resin, 1 to 60 parts,
a platinum catalyst, 0.01 to 5 parts,
an inhibitor, 0.01 to 2 parts,
a filler, 1 to 60 parts, and
a dye paste, 1 to 10 parts;

wherein an average composition formula (1) of the vinyl MTQ silicon resin is as follows:

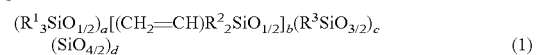

$$(R^1{}_3SiO_{1/2})_a[(CH_2\!=\!\!CH)R^2{}_2SiO_{1/2}]_b(R^3SiO_{3/2})_c(SiO_{4/2})_d \qquad (1)$$

wherein $R^1$, $R^2$ and $R^3$ are identical or different substituents, $R^1$, $R^2$ and $R^3$ are selected from the group consisting of an alkyl, an aryl, an aryl-substituted alkyl, an alkenyl, gamma-glycidyloxypropyl, gamma-(methacryloxy)propyl, and 2-(3, 4-epoxycyclohexyl); and a, b, c, and d are all positive numbers and satisfy the following requirements: a+b+c+d=1, 0.5≤(a+b+c)/d≤1.5, and 3≤(a+b)/c≤8;

an average composition formula (2) of the spherical vinyl MQ silicon resin is as follows:

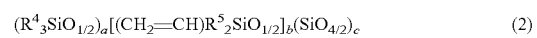

$$(R^4{}_3SiO_{1/2})_a[(CH_2\!=\!\!CH)R^5{}_2SiO_{1/2}]_b(SiO_{4/2})_c \qquad (2)$$

wherein $R^4$ and $R^5$ are identical or different substituents, $R^4$ and $R^5$ are selected from the group consisting of an alkyl, an aryl, an aryl-substituted alkyl, an alkenyl, gamma-glycidyloxypropyl, gamma-(methacryloxy)propyl, and 2-(3, 4-epoxycyclohexyl); and a, b and c are all positive numbers and satisfy the following requirements: a+b+c=1 and 0.5≤(a+b)/c≤1.5;

on average, each molecule of the organopolysiloxane has at least two alkenyl groups; and the organic hydrogenated polysiloxane has at least two hydrogen atoms bonded to a silicon atom in each molecule.

In the surface glue layer and the bottom glue layer of the organosilicon synthetic leather, for every 100 parts by mass of the organopolysiloxane, 0.1 to 10 parts of the organic hydrogenated polysiloxane is added. If the added amount were less than 0.1 parts by mass, the crosslinking between the bottom glue layer and the surface glue layer would be incomplete, which results in a low crosslink density and the organosilicon synthetic leather would not have desirable smoothness. If the added amount were more than 10 parts by mass, excessive crosslinking between the bottom glue layer and the surface glue layer would take place, a dehydrogenation reaction would occur, and bubbles would be generated.

In the surface glue layer and the bottom glue layer of the organosilicon synthetic leather, for every 100 parts by mass of the organopolysiloxane, 1 to 60 parts by mass of the vinyl MTQ silicon resin is added. If the added amount were less than 1 part by mass, the vinyl MTQ silicon resin has no obvious reinforcing effect on the prepared glue, and its effect would be limited. If the added amount were more than 60 parts by mass, the prepared glue would have a hardness that is too high, and would lack a soft touch.

For the base layer of the orginosilicon synthetic leather, its substrate is selected from the group consisting of dacron, spandex, acrylic fiber, chinlon, polyvinyl chloride fiber, OPF fiber, viscose fiber, aramid, natural fiber, carbon fiber, glass fiber, and a fabric made from any two, three, four or more of the aforementioned compounds blended in any ratio. The structure of the substrate may be a two-way stretch, a four-way stretch or a non-stretch knitted construction, a two-way stretch, a four-way stretch or a non-stretch tatting construction, or may be a figured islands-in-sea or a non-figured islands-in-sea microfiber or a non-woven fabric.

In some of the embodiments, the organosilicon synthetic leather comprises a surface glue layer, a bottom glue layer, and a base layer which are stacked sequentially, the surface glue layer is prepared from the following main raw materials in parts by mass:
an organopolysiloxane, 100 parts,
an organic hydrogenated polysiloxane, 1 to 8 parts,
a vinyl MTQ silicon resin, 25 to 45 parts,
a spherical vinyl MQ silicon resin, 30 to 80 parts,
a platinum catalyst, 0.1 to 4 parts,
an inhibitor, 0.01 to 2 parts,
a filler, 5 to 45 parts, and
a dye paste, 0 to 10 parts;
the bottom glue layer is prepared from the following main raw materials in parts by mass:
an organopolysiloxane, 100 parts,
an organic hydrogenated polysiloxane, 2 to 7 parts,
a vinyl MTQ silicon resin, 15 to 55 parts,
a platinum catalyst, 0.1 to 4 parts,
an inhibitor, 0.01 to 2 parts,
a filler, 5 to 60 parts, and
a dye paste, 1 to 10 parts;
wherein the average composition formula (2) of the spherical vinyl MQ silicon resin is as follows:

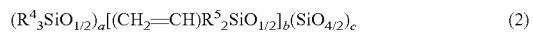

$(R^4_3SiO_{1/2})_a[(CH_2=CH)R^5_2SiO_{1/2}]_b(SiO_{4/2})_c$ (2)

wherein $R^4$ and $R^5$ are identical or different substituents,
$R^4$ and $R^5$ are selected from the group consisting of an alkyl, an aryl, an aryl-substituted alkyl, an alkenyl, gamma-glycidyloxypropyl, gamma-(methacryloxy)propyl, and 2-(3,4-epoxycyclohexyl); and a, b and c are all positive numbers and satisfy the following requirements: a+b+c=1 and 0.7≤(a+b)/c≤1.3.

In some of the embodiments, $R^1$, $R^2$, $R^3$, $R^4$ and $R^5$ described above are each independently selected from the group consisting of a $C_1$-$C_{12}$ alkyl, a $C_6$-$C_{12}$ aryl, a $C_7$-$C_{12}$ aryl-substituted alkyl, a $C_2$-$C_{12}$ alkenyl, gamma-glycidyloxypropyl, gamma-(methacryloxy)propyl, and 2-(3,4-epoxycyclohexyl).

In some of the embodiments, $R^1$, $R^2$, $R^3$, $R^4$ and $R^5$ described above are each independently selected from the group consisting of a $C_1$-$C_8$ alkyl, a $C_6$-$C_{10}$ aryl, a $C_7$-$C_9$ aryl-substituted alkyl, a $C_2$-$C_8$ alkenyl, gamma-glycidyloxypropyl, gamma-(methacryloxy)propyl, and 2-(3,4-epoxycyclohexyl).

Specific examples of $R^1$, $R^2$, $R^3$, $R^4$ and $R^5$ described above comprise, but are not limited to the following: methyl, ethyl, n-propyl, isopropyl, n-butyl, isobutyl, tert-butyl, octyl; phenyl, tolyl, xylyl, naphthyl; benzyl, phenethyl, phenylpropyl; vinyl, allyl, propenyl, isopropenyl, butenyl, hexenyl, cyclohexenyl, and octenyl.

In some of the embodiments, $R^1$, $R^2$, $R^3$, $R^4$ and $R^5$ described above are each independently selected from the group consisting of methyl and phenyl.

In some of the embodiments, in the surface glue layer, a ratio of total moles of active hydrogen atoms to total moles of vinyl groups is in a range from 0.5 to 4.5; the total moles of the active hydrogen atoms are moles of hydrogen atoms directly bonded to silicon atoms in the organic hydrogenated polysiloxane, and the total moles of the vinyl groups are the sum of moles of vinyl groups in the vinyl MTQ silicon resin, moles of vinyl groups in the spherical vinyl MQ silicon resin, and moles of vinyl groups in the organopolysiloxane.

In some of the embodiments, in the bottom glue layer, a ratio of total moles of active hydrogen atoms to total moles of vinyl groups is 0.5 to 4.5; the total moles of the active hydrogen atoms are moles of hydrogen atoms directly bonded to silicon atoms in the organic hydrogenated polysiloxane; the total moles of the vinyl groups are a sum of moles of vinyl groups in the vinyl MTQ silicon resin and moles of vinyl groups in the organopolysiloxane.

In some of the embodiments, the mass fraction of the vinyl groups in the spherical vinyl MQ silicon resin is in a range from 0.1% to 10%.

In some of the embodiments, the mass fraction of the vinyl groups in the spherical vinyl MQ silicon resin is in a range from 1% to 4.5%.

In some of the embodiments, the mass fraction of the vinyl groups in the vinyl MTQ silicon resin is in a range from 0.1 to 10%. If the mass fraction of the vinyl groups is too low, mechanical support would not be enough, and the network structure formed has a pressure-sensitive property and a sticky surface. If the mass fraction of the vinyl groups is too high, the degree of crosslinking would be too large, resulting in brittle glue, thus the glue is not suitable for coating. When the mass fraction of the vinyl groups in the vinyl MTQ silicon resin is 0.1% to 10%, the organosilicon synthetic leather prepared by the vinyl MTQ silicon resin has a better mechanical support property.

In some of the embodiments, the mass fraction of the vinyl groups in the vinyl MTQ silicon resin is in a range from 1% to 6%.

In some of the embodiments, the mass fraction of the vinyl groups in the organopolysiloxane is in a range from 0.02% to 0.3%.

In some of the embodiments, the mass fraction of the vinyl groups in the organopolysiloxane is in a range from 0.06% to 0.25%.

In some of the embodiments, the mass fraction of the hydrogen atoms directly bonded to silicon atoms in the organic hydrogenated polysiloxane is in a range from 0.1% to 1.6%.

In some of the embodiments, the mass fraction of the hydrogen atoms directly bonded to silicon atoms in the organic hydrogenated polysiloxane is in a range from 0.5% to 1.2%.

In some of the embodiments, the spherical vinyl MQ silicon resin has a particle diameter ranging from 1 μm to 10 μm. When the spherical vinyl MQ silicon resin has a particle diameter ranging from 1 μm to 10 μm, the product prepared from the spherical vinyl MQ silicon resin has good wear resistance.

In some of the embodiments, the spherical vinyl MQ silicon resin has a particle diameter ranging from 1 μm to 5 μm.

In some of the embodiments, the organopolysiloxane has an average composition formula (3) as follows:

wherein $R^6$ is a substituted or unsubstituted monovalent hydrocarbyl group which is the same or different from each other and is directly bonded to a silicon atom, and a is a number satisfying the requirement of $1.5 \leq a \leq 2.8$.

Specific examples of $R^6$ as described above comprises, but are not limited to the following: methyl, ethyl, n-propyl, isopropyl, n-butyl, isobutyl, tert-butyl, pentyl, hexyl octyl; phenyl, tolyl, xylyl, naphthyl; benzyl, phenethyl, phenylpropyl; vinyl, allyl, propenyl, isopropenyl, butenyl, hexenyl, cyclohexenyl, and octenyl; or a hydrocarbyl formed by substituting all or part of the hydrogen atoms of the aforementioned groups with halogen atoms such as fluorine atoms, bromine atoms, and chlorine atoms, or with cyano groups, or the like, examples include chloromethyl, chloropropyl, bromoethyl, trifluoromethyl, and cyanoethyl.

In some of the embodiments, a is a number satisfying the requirement of $1.95 \leq a \leq 2.05$.

In some of the embodiments, the viscosity of the organopolysiloxane is not particularly limited. It is in a range from 500 mPa·s to 500,000 mPa·s at 25° C., taking mechanical properties of the glue and the coating process into account.

In some of the embodiments, the organopolysiloxane has a viscosity of 1,000 mPa·s to 300,000 mPa·s at 25° C.

In some of the embodiments, the organopolysiloxane has 2 to 60 alkenyl groups in each molecule.

In some of the embodiments, the organopolysiloxane has 2 to 30 alkenyl groups in each molecule.

In some of the embodiments, the alkenyl group is an alkenyl group having 2 to 7 carbon atoms.

In some of the embodiments, the alkenyl group is an alkenyl group having 2 to 5 carbon atoms.

In some of the embodiments, the alkenyl group is vinyl.

In some of the embodiments, in the organopolysiloxane, the alkenyl group may be at both ends of the chain, in the middle of the chain, or a combination thereof. From the perspective of adjusting the mechanical properties of the glue, a single structure may be employed, or two or more structures may be employed in combination.

In some of the embodiments, the molecular chain of the organopolysiloxane may be linear, branched or cyclic, and they may be used singly or in combination.

In some of the embodiments, the organopolysiloxane further includes a group other than an alkenyl group, which specifically may be an alkyl group such as methyl, ethyl, n-propyl, isopropyl, n-butyl, isobutyl, tert-butyl, pentyl, hexyl, octyl, or the like.

In some of the embodiments, the organopolysiloxane further includes a methyl group besides an alkenyl group.

Specifically, examples of the organopolysiloxane include, but are not limited to a dimethylvinylsiloxy-terminated dimethylpolysiloxane, a dimethylvinylsiloxy-terminated dimethylsiloxane/methylvinylsiloxane copolymer, a dimethylvinylsiloxy-terminated dimethylsiloxane/methylphenylsiloxane copolymer, a dimethylvinylsiloxy-terminated dimethylsiloxane/methylvinylsiloxane/methylphenylsiloxane copolymer, a dimethylvinylsiloxy-terminated dimethylsiloxane/diphenylsiloxane copolymer, a dimethylvinylsiloxy-terminated dimethylsiloxane/methylvinylsiloxane/diphenylsiloxane copolymer, and a trimethylsiloxy-terminated dimethylsiloxane/methylvinylsiloxane copolymer.

In some embodiments, the organic hydrogenated polysiloxane at least has two hydrogen atoms bonded to a silicon atom in each molecule; the hydrogen atoms may be bond to one end of the hydrogenated polysiloxane or may be in the middle of the molecular chain, or a combination thereof. The hydrogen atoms are crosslinked with the above organopolysiloxane to form a spatial network structure.

In some embodiments, the organic hydrogenated polysiloxane has a viscosity in a range from 1 to 1,000 mPa·s at 25° C.

In some embodiments, the organic hydrogenated polysiloxane has a viscosity in a range from 5 mPa·s to 500 mPa·s at 25° C.

In some embodiments, the configuration of the organic hydrogenated polysiloxane is not particularly limited and may be linear, branched or cyclic. Molecules with these configurations may be used singly or in combination. The organic hydrogenated polysiloxane may also have another substituent group other than the hydrogen atom; specifically, such a substituent group may be an alkyl, such as methyl, ethyl, n-propyl, isopropyl, n-butyl, isobutyl, tert-butyl, pentyl, hexyl, octyl, or the like.

Specific examples of the organic hydrogenated polysiloxane include, but are not limited to a trimethylsiloxy-terminated methylhydrogenpolysiloxane, a trimethylsiloxy-terminated dimethylsiloxane/methylhydrogensiloxane copolymer, and a dimethylhydrosiloxy-terminated dimethylsiloxane/methylhydrogensiloxane copolymer.

In some of the embodiments, the amount of Pt atoms in the platinum catalyst is 1,000 ppm to 20,000 ppm.

In some of the embodiments, the platinum catalyst is at least one selected from the group consisting of platinum black, platinum-loaded silica, platinum-loaded alumina, platinum-loaded carbon black, chloroplatinic acid, a solution of chloroplatinic acid in isopropanol, a solution of chloroplatinic acid in ethanol, platinum-1,3 divinyltetramethyldisiloxane complex, a platinum-tetravinylcyclotetrasiloxane complex, and a platinum-enyne complex.

In some of the embodiments, the platinum catalyst is platinum-1,3 divinyltetramethyldisiloxane complex.

In some of the embodiments, the inhibitor is at least one selected from the group consisting of an alkynol compound, polyvinyl siloxane, an amide, pyridine, imidazole, and a P atom-containing compound.

In some of the embodiments, the inhibitor is an alkynol compound selected from the group consisting of methylbutynol, ethynylcyclohexanol, an alkynyl-containing maleic acid or a derivative thereof, and an alkynyl-containing fumaric acid or a derivative thereof.

In some of the embodiments, the inhibitor is ethynylcyclohexanol.

In some of the embodiments, the inhibitor is a P atom-containing compound selected from the group consisting of an organophosphorus compound and a phosphite ester.

In some embodiments, the filler is not particularly limited, and various inorganic fillers may be used.

In some embodiments, the filler is one or more selected from the group consisting of fumed silica, precipitated silica, carbon black, pulverized quartz powder, alumina, magnesia, silicon carbide, diatomaceous earth, talcum powder, kaolin, and graphene.

In some embodiments, the dye paste is a pigment using vinyl-terminated polydimethylsiloxane as a dispersion medium, and the pigment may be an inorganic pigment or an organic pigment.

Further, any well-known component in the art may be added to an extent that does not impair the effects of the present invention. Examples of this component include an anti-fungus and antibacterial material, a halogen-free flame retardant, a hand-feeling auxiliary, an antistatic agent, a release agent, and a tackifier. The anti-fungus and antibacterial material includes, but is not limited to nano-silver, molecular silver, and isothiazolinone or a derivative thereof. The halogen-free flame retardant includes, but is not limited to benzotriazole, magnesium hydroxide, aluminum hydroxide, and zinc borate. The hand-feeling auxiliary includes, but is not limited to a waxy substance such as PE wax, polytetrafluoroethylene wax, or the like. The tackifier is used to promote the adhesion of the bottom glue layer to a cloth.

The present invention also provides a preparation method of the aforementioned organosilicon synthetic leather, which is carried out by coating the surface glue and the bottom glue according to the present invention. The coating may be spraying-coating, coating with a doctor blade, coating by a tape-casting method, coating by a screen-printing method, dip coating, pin coating, or other known coating methods.

The specific technical solution is as follows:

A method for preparing the aforementioned organosilicon synthetic leather, comprising the following steps:

(1) uniformly mixing the raw materials of the above surface glue layer to obtain a surface glue;

(2) coating a release paper with the surface glue, performing heat curing to obtain a cured surface glue layer;

(3) uniformly mixing the raw materials of the above bottom glue layer to obtain a bottom glue; and (4) coating the cured surface glue layer with the bottom glue to form the bottom glue layer, compositing the bottom glue layer with the base layer; performing heat curing; and striping the release paper to obtain the organosilicon synthetic leather.

In some embodiments, in step (2), when the surface glue is being coated on the release paper, the coating speed of the coating machine is set at 3 to 15 m/min. The heat curing in step (2) is performed at a temperature of 80 to 150° C. for 1 to 10 minutes.

In some of the embodiments, in step (4), when the bottom glue is being coated on the cured surface glue layer of step (2), the coating speed of the coating machine is set at 3 to 15 m/min. The heat curing in step (4) is performed at a temperature of 80 to 150° C. for 2 to 10 minutes.

Compared with the prior art, the present invention has the following beneficial effects:

The organosilicon synthetic leather according to the present invention comprises a base layer, a bottom glue layer and a surface glue layer which are stacked sequentially. The surface glue layer comprises an organopolysiloxane as a base polymer, an organic hydrogenated polysiloxane as a crosslinking agent, a vinyl MTQ silicon as a reinforcing agent, and a spherical vinyl MQ silicon resin as a main wear-resistant component; these main components are mixed at an appropriate ratio and they synergize with other components so that the surface glue layer has good wear resistance, anti-fouling property, and feels good in the hand. The bottom glue layer comprises an organopolysiloxane as a base polymer, an organic hydrogenated polysiloxane as a crosslinking agent, and a vinyl MTQ silicon resin as a reinforcing agent; these main components are mixed at an appropriate ratio and they synergize with other components so that the bottom glue layer is soft and has good flame retardancy. Meanwhile, the bottom glue layer also plays a role in bonding the surface glue layer to the base layer, and there is good adhesion between the substrate of the base layer and the bottom glue layer of the present invention. The surface glue layer, the bottom glue layer and the base layer of the present invention as a whole allow the organosilicon synthetic leather of the present invention to have excellent safety performance, wear resistance, antifouling property and flame retardancy. The organosilicon synthetic leather of the present invention is simple to prepare, and no solvent is involved in the preparation process.

DETAILED DESCRIPTION OF PREFERRED EMBODIMENTS

The present invention will be specifically described below by specific embodiments, but the present invention is not limited by the following specific embodiments. The term "parts" in the following specific embodiments represents "parts by mass".

In the following preparation process, in order to uniformly mix the filler and the organopolysiloxane, it is known in the art that a treating agent such as hexamethyldisilazane, dimethyldichlorosilane, trimethylchlorosilane, vinyltrimethoxy, vinyltriethoxysilane, or the like may be added to treat the surface of the filler. Unless otherwise stated, other mixing processes are existing conventional techniques.

In the following examples, the organopolysiloxane, the organic hydrogenated polysiloxane, the vinyl MTQ silicon resin, and the spherical vinyl MQ silicon resin are provided by Jiangxi Jiayi New Material Co., Ltd. The dye paste and the platinum catalyst are produced by Guagnzhou Xibo Chemical Technology Co., Ltd. Unless otherwise stated, other raw materials used are commercially available.

In the following examples, the organopolysiloxane (A) used is as shown in Table 1.

TABLE 1

Performance parameters of organopolysiloxane

| | Viscosity (mPa · s, at 25° C.) | Vinyl content (wt %) | Name of organopolysiloxane |
| --- | --- | --- | --- |
| A-1 | 10,000 | 0.2 | dimethylvinylsiloxy-terminated |
| A-2 | 20,000 | 0.13 | dimethylsiloxane/methylvinylsiloxane |
| A-3 | 5,000 | 0.16 | copolymer |

In the following examples, the organic hydrogenated polysiloxane (B) used is as shown in Table 2:

TABLE 2

Performance parameters of organic hydrogenated polysiloxane

| | Viscosity (mPa · s, at 25° C.) | Hydrogen content (wt %) | Name of organic hydrogenated polysiloxane |
| --- | --- | --- | --- |
| B-1 | 50 | 1 | Poly(methylhydrosiloxane) |
| B-2 | 100 | 0.5 | terminated with trimethylsiloxy |
| B-3 | 200 | 1.2 | groups |
| B-4 | 200 | 0.75 | |

In the following examples, the average composition formula of the vinyl MTQ silicon resin (C) used is as follows.

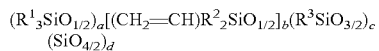

The groups and related parameters in the average composition formula of the vinyl MTQ silicon resin are shown in Table 3:

TABLE 3

Groups and related parameters in the average composition formula of vinyl MTQ silicon resin

| | Vinyl content (wt %) | $R^1$ | $R^2$ | $R^3$ | a | b | c | d | (a + b + c)/d | (a + b)/c |
|---|---|---|---|---|---|---|---|---|---|---|
| C-1 | 0.8 | Methyl | Methyl | Methyl | 0.3 | 0.02 | 0.1 | 0.58 | 0.72 | 3.2 |
| C-2 | 3.3 | Methyl | Methyl | Methyl | 0.334 | 0.086 | 0.08 | 0.50 | 1.0 | 5.25 |
| C-3 | 5.2 | Methyl | Methyl | Methyl | 0.36 | 0.14 | 0.08 | 0.42 | 1.38 | 6.25 |

In the following examples, the average composition formula of the spherical vinyl MQ silicon resin (D) used is as follows:

The groups and related parameters in the average composition formula of the spherical vinyl MQ silicon resin are shown in Table 4:

TABLE 4

Groups and related parameters in the average composition formula of spherical vinyl MQ silicon resin

| | Vinyl content (wt %) | Particle diameter (μm) | $R^4$ | $R^5$ | a | b | c | (a + b)/c |
|---|---|---|---|---|---|---|---|---|
| D-1 | 2.5 | 3 | Methyl | Methyl | 0.385 | 0.065 | 0.55 | 0.81 |
| D-2 | 0.30 | 8 | Methyl | Methyl | 0.3525 | 0.0075 | 0.64 | 0.56 |
| D-3 | 4.4 | 5 | Methyl | Methyl | 0.46 | 0.12 | 0.42 | 1.38 |
| d-1 | 2.5 | 13 | Methyl | Methyl | 0.385 | 0.065 | 0.55 | 0.81 |

The raw materials and properties of the organosilicon synthetic leathers of Examples 1 to 8 are shown in Table 5:

TABLE 5

Raw materials and properties of the organosilicon synthetic leather of Examples 1 to 8

| | | | Example 1 | Example 2 | Example 3 | Example 4 | Example 5 | Example 6 | Example 7 | Example 8 |
|---|---|---|---|---|---|---|---|---|---|---|
| Surface glue layer | organopolysiloxane | A-1 | 100 | 100 | 100 | — | 100 | 100 | 100 | 100 |
| | | A-2 | — | — | — | 100 | — | — | — | — |
| | organic hydrogenated polysiloxane | B-1 | 5 | 9 | 7 | — | — | — | 7 | 6 |
| | | B-3 | — | — | — | 8.5 | 6.5 | 9 | — | — |
| | vinyl MTQ silicon resin | C-1 | — | — | — | 50 | — | — | — | — |
| | | C-2 | 20 | 10 | 11 | — | 25 | 5 | — | 10 |
| | | C-3 | — | — | — | — | — | — | 10 | — |
| | spherical vinyl MQ silicon resin | D-1 | 30 | 55 | — | — | 45 | 75 | 55 | — |
| | | D-2 | — | — | 20 | — | — | — | — | — |
| | | D-3 | — | — | — | 15 | — | — | — | — |
| | | d-1 | — | — | — | — | — | — | — | 55 |
| | Ratio of silicon to hydrogen | | 0.84 | 1.28 | 3.03 | 2.31 | 0.98 | 1.3 | 0.90 | 0.85 |
| | platinum-1,3 divinyltetramethyldisiloxane complex (the mass content of Pt is 8,000 ppm) | | 1.5 | 1.5 | 1.5 | 1.5 | 1.5 | 1.5 | 1.5 | 1.5 |
| | Fumed silica (a specific surface area of 200 m²/g) | | 20 | 20 | 20 | 20 | 20 | 20 | 20 | 20 |
| | Ethynylcyclohexanol | | 0.5 | 0.5 | 0.5 | 0.5 | 0.5 | 0.5 | 0.5 | 0.5 |
| | Dye paste | | 5 | 5 | 5 | 5 | 5 | 5 | 5 | 5 |

TABLE 5-continued

Raw materials and properties of the organosilicon synthetic leather of Examples 1 to 8

| | | | Example 1 | Example 2 | Example 3 | Example 4 | Example 5 | Example 6 | Example 7 | Example 8 |
|---|---|---|---|---|---|---|---|---|---|---|
| Bottom glue layer | organopolysiloxane | A-1 | 100 | 100 | 100 | 100 | 100 | 100 | 100 | 100 |
| | organic hydrogenated polysiloxane | B-2 | 8 | 8 | 8 | 8 | 8 | 8 | 8 | 8 |
| | vinyl MTQ silicon resin | C-2 | 15 | 15 | 15 | 15 | 15 | 15 | 15 | 15 |
| | Ratio of silicon to hydrogen | | 1.55 | 1.55 | 1.55 | 1.55 | 1.55 | 1.55 | 1.55 | 1.55 |
| | Solution of chloroplatinic acid in isopropanol (the mass content of Pt is 30,000 ppm) | | 2.5 | 2.5 | 2.5 | 2.5 | 2.5 | 2.5 | 2.5 | 2.5 |
| | Fumed silica (a specific surface area of 200 $m^2/g$) | | 20 | 20 | 20 | 20 | 20 | 20 | 20 | 20 |
| | Ethynylcyclohexanol | | 0.5 | 0.5 | 0.5 | 0.5 | 0.5 | 0.5 | 0.5 | 0.5 |
| | Dye paste | | 10 | 10 | 10 | 10 | 10 | 10 | 10 | 10 |
| Base layer | substrate | | Dacron cloth | | | | | | | |
| 1 | Wear resistance test 1 | | Grade 5 | Grade 5 | Grade 5 | Grade 5 | Grade 5 | Grade 5 | Grade 5 | Grade 4 |
| | Wear resistance test 2 | | Grade 5 | Grade 5 | Grade 5 | Grade 5 | Grade 5 | Grade 5 | Grade 5 | Grade 4 |
| 2 | Hydrolysis resistance test | | No change | No change | No change | No change | No change | No change | No change | No change |
| 3 | Flame retardant test 1 | | Pass | Pass | Pass | Pass | Pass | Pass | Pass | Pass |
| | Flame retardant test 2 | | Pass | Pass | Pass | Pass | Pass | Pass | Pass | Pass |
| | Flame retardant test 3 | | Pass | Pass | Pass | Pass | Pass | Pass | Pass | Pass |
| 4 | Cytotoxicity test | | Grade 0 | Grade 0 | Grade 0 | Grade 0 | Grade 0 | Grade 0 | Grade 0 | Grade 0 |
| 5 | Skin allergy test | | Grade 0 | Grade 0 | Grade 0 | Grade 0 | Grade 0 | Grade 0 | Grade 0 | Grade 0 |
| 6 | Anti-fouling property test | | Grade 4 | Grade 4 | Grade 4 | Grade 4 | Grade 4 | Grade 4 | Grade 4 | Grade 4 |
| 7 | Smoothness test | | A | A | A | A | A | A | A | A |
| 8 | Peel test | | 30N | 32N | 31N | 30N | 33N | 32N | 30N | 28N |

Note: In the surface glue layer, the ratio of silicon to hydrogen refers to a ratio of the total moles of active hydrogen atoms to the total moles of vinyl groups; the total moles of active hydrogen atoms are the moles of hydrogen atoms directly bonded to silicon atoms in the organic hydrogenated polysiloxane; the total moles of the vinyl groups are the sum of the moles of vinyl groups in the vinyl MTQ silicon resin, the moles of vinyl groups in the spherical vinyl MQ silicon resin, and the moles of vinyl groups in the organopolysiloxane. In the bottom glue layer, the ratio of silicon to hydrogen refers to a ratio of the total moles of active hydrogen atoms to the total moles of vinyl groups; the total moles of the active hydrogen atoms are the moles of hydrogen atoms directly bonded to silicon atoms in the organic hydrogenated polysiloxane; the total moles of the vinyl groups are the sum of the moles of vinyl groups in the vinyl MTQ silicon resin and the moles of vinyl groups in the organopolysiloxane.

The raw materials and properties of the organosilicon synthetic leathers of Examples 9 to 13 are shown in Table 6:

TABLE 6

Raw materials and properties of the organosilicon synthetic leather of Examples 9 to 13

| | | | Example 9 | Example 10 | Example 11 | Example 12 | Example 13 |
|---|---|---|---|---|---|---|---|
| Surface glue layer | organopolysiloxane | A-1 | 100 | 100 | 100 | 100 | 100 |
| | organic hydrogenated polysiloxane | B-3 | 6.5 | 6.5 | 6.5 | 6.5 | 6.5 |
| | vinyl MTQ silicon resin | C-2 | 25 | 25 | 25 | 25 | 25 |
| | spherical vinyl MQ silicon resin | D-1 | 45 | 45 | 45 | 45 | 45 |
| | Ratio of silicon to hydrogen | | 0.98 | 0.98 | 0.98 | 0.98 | 0.98 |
| | platinum-1,3 divinyltetramethyldisiloxane complex (the mass content of Pt is 8,000 ppm) | | 1.5 | 1.5 | 1.5 | 1.5 | 1.5 |
| | Fumed silica (a specific surface area of 200 $m^2/g$) | | 20 | 20 | 20 | 20 | 20 |
| | Ethynylcyclohexanol | | 0.5 | 0.5 | 0.5 | 0.5 | 0.5 |
| | Dye paste | | 5 | 5 | 5 | 5 | 5 |

TABLE 6-continued

Raw materials and properties of the organosilicon synthetic leather of Examples 9 to 13

| | | | Example 9 | Example 10 | Example 11 | Example 12 | Example 13 |
|---|---|---|---|---|---|---|---|
| Bottom glue layer | organopolysiloxane | A-1 | — | 100 | — | 100 | — |
| | | A-2 | — | — | 100 | — | 100 |
| | | A-3 | 100 | — | — | — | — |
| | organic hydrogenated polysiloxane | B-2 | — | — | 5 | — | — |
| | | B-3 | 3 | 2 | — | 2.5 | — |
| | | B-4 | — | — | — | — | 9.8 |
| | vinyl MTQ silicon resin | C-1 | — | — | 55 | 8 | — |
| | | C-2 | 25 | 8 | — | — | 43 |
| | Ratio of silicon to hydrogen | | 0.99 | 1.40 | 1.18 | 3.07 | 1.28 |
| | Solution of chloroplatinic acid in isopropanol (the mass content of Pt is 30,000 ppm) | | 1.5 | 1.5 | 1.5 | 1.5 | 1.5 |
| | Fumed silica (a specific surface area of 200 m$^2$/g) | | 20 | 20 | 20 | 20 | 20 |
| | Ethynylcyclohexanol | | 0.5 | 0.5 | 0.5 | 0.5 | 0.5 |
| | Dye paste | | 10 | 10 | 10 | 10 | 10 |
| Base layer | substrate | | Base fabric obtained by blending dacron and spandex | | | | |
| 1 | Wear resistance test 1 | | Grade 5 | Grade 5 | Grade 5 | Grade 5 | Grade 5 |
| | Wear resistance test 2 | | Grade 5 | Grade 5 | Grade 5 | Grade 5 | Grade 5 |
| 2 | Hydrolysis resistance test | | No change | No change | No change | No change | No change |
| 3 | Flame retardant test 1 | | Pass | Pass | Pass | Pass | Pass |
| | Flame retardant test 2 | | Pass | Pass | Pass | Pass | Pass |
| | Flame retardant test 3 | | Pass | Pass | Pass | Pass | Pass |
| 4 | Cytotoxicity test | | Grade 0 | Grade 0 | Grade 0 | Grade 0 | Grade 0 |
| 5 | Skin allergy test | | Grade 0 | Grade 0 | Grade 0 | Grade 0 | Grade 0 |
| 6 | Anti-fouling test | | Grade 5 | Grade 5 | Grade 5 | Grade 5 | Grade 5 |
| 7 | Smoothness test | | A | A | A | A | A |
| 8 | Peel test | | 31N | 30N | 31N | 28N | 30N |

Note: In the surface glue layer, the ratio of silicon to hydrogen refers to a ratio of the total moles of active hydrogen atoms to the total moles of vinyl groups; the total moles of active hydrogen atoms are the moles of hydrogen atoms directly bonded to silicon atoms in the organic hydrogenated polysiloxane; the total moles of the vinyl groups are the sum of the moles of vinyl groups in the vinyl MTQ silicon resin, the moles of vinyl groups in the spherical vinyl MQ silicon resin, and the moles of vinyl groups in the organopolysiloxane. In the bottom glue layer, the ratio of silicon to hydrogen refers to a ratio of the total moles of active hydrogen atoms to the total moles of vinyl groups; the total moles of the active hydrogen atoms are the moles of hydrogen atoms directly bonded to silicon atoms in the organic hydrogenated polysiloxane; the total moles of the vinyl groups are the sum of the moles of vinyl groups in the vinyl MTQ silicon resin and the moles of vinyl groups in the organopolysiloxane.

RESULTS: It can be seen from Table 5 and Table 6 that the organosilicon synthetic leathers of Examples 1 to 13 have good wear resistance, hydrolysis resistance, flame retardancy and smoothness. In addition, the raw materials of the digitally printed synthetic leathers of Examples 1 to 13 are environmentally friendly, and none of them is cytotoxic or causes skin irritation. The peeling loads of the organosilicon synthetic leathers of Examples 1 to 13 are in a range from 28N to 33N, indicating that the adhesion between the surface glue layer, the bottom glue layer and the base layer constituting the organosilicon synthetic leathers is good. It is thus understood that the organosilicon synthetic leather of the present invention has excellent safety performance, wear resistance, antifouling property, and flame retardancy.

The organosilicon synthetic leathers of Comparative Examples 1 to 3 are as follows:

Comparative Example 1

The raw materials for each layer of the organosilicon synthetic leather of Comparative Example 1 are the same as those in Example 11, except that the surface glue layer of Comparative Example 1 contains no spherical vinyl MQ silicon resin.

Comparative Example 2

The raw materials for each layer of the organosilicon synthetic leather of Comparative Example 2 are the same as those in Example 11, except that the surface glue layer of Comparative Example 2 contains no vinyl MTQ silicon resin.

Comparative Example 3

The raw materials for each layer of the organosilicon synthetic leather of Comparative Example 3 are the same as those in Example 11, except that the bottom glue layer of Comparative Example 3 contains no vinyl MTQ silicon resin.

TABLE 7

Performances of organosilicon synthetic leathers of Comparative Examples 1 to 3

| | | Comparative Example 1 | Comparative Example 2 | Comparative Example 3 |
|---|---|---|---|---|
| 1 | Wear resistance test 1 | Grade 2 | Grade 3 | Grade 4 |
| | Wear resistance test 2 | Grade 2 | Grade 4 | Grade 4 |
| 2 | Hydrolysis resistance test | No change | No change | No change |
| 3 | Flame retardant test 1 | Pass | Pass | Pass |
| | Flame retardant test 2 | Pass | Pass | Pass |
| | Flame retardant test 3 | Pass | Pass | Pass |
| 4 | Cytotoxicity test | Grade 0 | Grade 0 | Grade 0 |
| 5 | Skin allergy test | Grade 0 | Grade 0 | Grade 0 |
| 6 | Anti-fouling property test | Grade 2 | Grade 3 | Grade 3 |
| 7 | Smoothness test | B | B | A |
| 8 | Bond Strength | 28N | 15N | 10N |

RESULTS: The surface glue layer of the organosilicon synthetic leather of Comparative Example 1 contained no spherical vinyl MQ silicon resin, which results in significant decreases in wear resistance, antifouling property, smoothness, and peeling load of the organosilicon synthetic leather of Comparative Example 1. The surface glue layer of the organosilicon synthetic leather of Comparative Example 2 contained no vinyl MTQ silicon resin, which results in significant decreases in peeling load, antifouling property and smoothness of the organosilicon synthetic leather of Comparative Example 2. The bottom glue layer of the organosilicon synthetic leather of Comparative Example 3 contained no vinyl MTQ silicon resin, which results in significant decreases in peeling load, antifouling property, smoothness, and wear resistance of the organosilicon synthetic leather of Comparative Example 3.

The preparation procedures of the organosilicon synthetic leathers of the above Examples 1 to 13 and Comparative Examples 1 to 3 comprised the following steps:

(1) uniformly mixing the raw materials of the surface glue layer to obtain a transparent surface glue;

(2) coating a release paper with the transparent surface glue using a doctor blade at a coating speed of 5 m/min, then performing heat curing to obtain a cured surface glue layer; wherein the heat curing is performed in an oven at 100° C. for 3 minutes;

(3) uniformly mixing the raw materials of the bottom glue layer to obtain a translucent bottom glue; and (4) coating the cured surface glue layer with the translucent bottom glue using a doctor blade at a coating speed of 5 m/min to obtain the bottom glue layer, compositing the bottom glue layer with the material of a base layer, performing heat curing, and then stripping away the release paper to obtain an organosilicon synthetic leather; wherein the heat curing was performed in an oven at 100° C. for 3 minutes.

1. Wear Resistance Test

Wear Resistance Test 1

Test method: the test was carried out in accordance with ISO/NP17076-2004, using a CS-10 grinding wheel with a load of 1000 g and a test revolution of 3000 rpm.

Evaluation Standard:
Grade 1: very obvious wear
Grade 2: obvious wear
Grade 3: distinguishable wear
Grade 4: hardly distinguishable wear
Grade 5: indistinguishable wear Wear Resistance Test 2

Test method: the test was carried out in accordance with ASTM D 4157-13, using 10 #canvas cotton, and with a test period of 300,000 cycles.

Evaluation Standard:
Grade 1: coating is worn through, revealing the base fabric;
Grade 2: coating is seriously worn, and pattern is smoothed;
Grade 3: coating pattern is worn but clearly recognizable;
Grade 4: coating pattern is hardly worn, and haze is slightly changed;
Grade 5: coating has no signs of wear, and haze has no change;

2. Hydrolysis Resistance Test

Test method: the test was carried out in accordance with ISO 1419:1995 with a test period of 10 weeks.

3. Flame Retardant Test:

Flame Retardant Test 1:

Test method: the test was carried out in accordance with FMVSS302.

Flame Retardant Test 2:

Test method: the test was carried out in accordance with CA 117-2013.

Flame Retardant Test 3:

Test method: the test was carried out in accordance with GB8410-2006.

4. Cytotoxicity Test

Test method: the test was carried out in accordance with ISO10993-5.

Evaluation Standard:
Grade 0: no cytotoxicity
Grade 1: slight cytotoxicity
Grade 2: mild cytotoxicity
Grade 3: moderate cytotoxicity
Grade 4: severe cytotoxicity 5. Skin Allergy Test Test method: the test was carried out in accordance with IS010993-10.

Evaluation Standard:
Grade 0: no reaction
Grade 1: weak positive reaction
Grade 2: moderate positive reaction
Grade 3: severe positive reaction 6. Anti-Fouling Property Test Test method: the test was carried out in accordance with CFFA-141.

Evaluation Standard:
Grade 1: stains not completely removed
Grade 2: large areas of stains
Grade 3: few stains
Grade 4: stains completely removed 7. Smoothness Test Test method: the test was carried out in accordance with instructions provided by Guagnzhuo Xibo Chemical Technology Co., Ltd.

Evaluation Standard:
A: dry and extremely smooth, B: smooth, and C: slip-stopping 8. Bond Strength Test method: according to GB/T8949-2008, three small pieces of leather samples were sized to a length of 150 mm and a width of 30 mm. The coating was bonded to a coating of the same kind of leather with an appropriate amount of an adhesive (the samples must be firmly bonded). After being at a constant temperature of 135° C.±5° C. for 2 hours, the bonded sample was hand-peeled until the coating of the sample was separated from the base cloth at a distance of 50 mm. The separated ends were respectively clamped to the clamps of a tensile tester and peeled at a speed of 200 mm/min. The maximum peeling load of the sample was recorded.

Evaluation standard: when the maximum peeling load of the sample is 18N or greater, it is considered to meet use requirements.

The technical features of the aforementioned embodiments may be arbitrarily combined. For the sake of brevity of description, all possible combinations of the technical features in the above embodiments are not described. However, all combinations of these technical features should be considered as the scope of this specification, as long as there is no contradiction among the combinations.

The aforementioned embodiments are merely illustrative of several embodiments of the present invention, although the description thereof is more specific and detailed, but they are not to be construed as limiting the scope of the invention. It should be noted that a number of variations and modifications may be made by those skilled in the art without departing from the spirit and scope of the present invention. Therefore, the scope of the present invention should be determined by the appended claims.

What is claimed is:

1. An organosilicon synthetic leather, wherein the organosilicon synthetic leather comprises a base layer, a bottom glue layer, and a surface glue layer which are stacked sequentially, the surface glue layer is prepared from the following main raw materials in parts by mass:
an organopolysiloxane, 100 parts,
an organic hydrogenated polysiloxane, 0.1 to 10 parts,
a vinyl MTQ silicon resin, 1 to 60 parts,
a spherical vinyl MQ silicon resin, 10 to 100 parts,
a platinum catalyst, 0.01 to 5 parts,
an inhibitor, 0.01 to 2 parts,
a filler, 1 to 60 parts, and
a dye paste, 0 to 10 parts;

the bottom glue layer is prepared from the following main raw materials in parts by mass:
an organopolysiloxane, 100 parts,
an organic hydrogenated polysiloxane, 0.1 to 10 parts,
a vinyl MTQ silicon resin, 1 to 60 parts,
a platinum catalyst, 0.01 to 5 parts,
an inhibitor, 0.01 to 2 parts,
a filler, 1 to 60 parts, and
a dye paste, 1 to 10 parts;

wherein an average composition formula (1) of the vinyl MTQ silicon resin is as follows:

$$(R^1{}_3SiO_{1/2})_a[(CH_2=CH)R^2{}_2SiO_{1/2}]_b(R^3SiO_{3/2})_c(SiO_{4/2})_d \qquad (1)$$

wherein $R^1$, $R^2$ and $R^3$ are identical or different substituents, $R^1$, $R^2$ and $R^3$ are selected from the group consisting of an alkyl, an aryl, an aryl-substituted alkyl, an alkenyl, gamma-glycidyloxypropyl, gamma-(methacryloxy) propyl, and 2-(3,4-epoxycyclohexyl); and a, b, c, and d are all positive numbers and satisfy the following requirements: a+b+c+d=1, 0.5≤(a+b+c)/d≤1.5, and 3≤(a+b)/c≤8;

an average composition formula (2) of the spherical vinyl MQ silicon resin is as follows:

$$(R^4{}_3SiO_{1/2})_a[(CH_2=CH)R^5{}_2SiO_{1/2}]_b(SiO_{4/2})_c \qquad (2)$$

wherein $R^4$ and $R^5$ are identical or different substituents, $R^4$ and $R^5$ are selected from the group consisting of an alkyl, an aryl, an aryl-substituted alkyl, an alkenyl, gamma-glycidyloxypropyl, gamma-(methacryloxy) propyl, and 2-(3,4-epoxycyclohexyl); and a, b and c are all positive numbers and satisfy the following requirements: a+b+c=1 and 0.5≤(a+b)/c≤1.5;

on average, each molecule of the organopolysiloxane has at least two alkenyl groups; and each molecule of the organic hydrogenated polysiloxane has at least two hydrogen atoms bonded to a silicon atom.

2. The organosilicon synthetic leather according to claim 1, wherein, the surface glue layer is prepared from the following main raw materials in parts by mass:
an organopolysiloxane, 100 parts,
an organic hydrogenated polysiloxane, 1 to 8 parts,
a vinyl MTQ silicon resin, 25 to 45 parts,
a spherical vinyl MQ silicon resin, 30 to 80 parts,
a platinum catalyst, 0.1 to 4 parts,
an inhibitor, 0.01 to 2 parts,
a filler, 5 to 45 parts, and
a dye paste, 0 to 10 parts;

the bottom glue layer is prepared from the following main raw materials in parts by mass:
an organopolysiloxane, 100 parts,
an organic hydrogenated polysiloxane, 2 to 7 parts,
a vinyl MTQ silicon resin, 15 to 55 parts,
a platinum catalyst, 0.1 to 4 parts,
an inhibitor, 0.01 to 2 parts,
a filler, 5 to 60 parts, and
a dye paste, 1 to 10 parts;

wherein the average composition formula (2) of the spherical vinyl MQ silicon resin is as follows:

$$(R^4{}_3SiO_{1/2})_a[(CH_2=CH)R^5{}_2SiO_{1/2}]_b(SiO_{4/2})_c \qquad (2)$$

wherein $R^4$ and $R^5$ are identical or different substituents, $R^4$ and $R^5$ are selected from the group consisting of an alkyl, an aryl, an aryl-substituted alkyl, an alkenyl, gamma-glycidyloxypropyl, gamma-(methacryloxy) propyl, and 2-(3,4-epoxycyclohexyl); and a, b and c are all positive numbers and satisfy the following requirements: a+b+c=1 and 0.7≤(a+b)/c≤1.3.

3. The organosilicon synthetic leather according to claim 1, wherein in the surface glue layer, a ratio of total moles of active hydrogen atoms to total moles of vinyl groups is 0.5 to 4.5; the total moles of the active hydrogen atoms are moles of hydrogen atoms directly bonded to silicon atoms in the organic hydrogenated polysiloxane; the total moles of the vinyl groups are a sum of moles of vinyl groups in the vinyl MTQ silicon resin, moles of vinyl groups in the spherical vinyl MQ silicon resin, and moles of vinyl groups in the organopolysiloxane.

4. The organosilicon synthetic leather according to claim 1, wherein in the bottom glue layer, a ratio of total moles of active hydrogen atoms to total moles of vinyl groups is 0.5 to 4.5; the total moles of the active hydrogen atoms are moles of hydrogen atoms directly bonded to silicon atoms in the organic hydrogenated polysiloxane; the total moles of the vinyl groups are a sum of moles of vinyl groups in the vinyl MTQ silicon resin and moles of vinyl groups in the organopolysiloxane.

5. The organosilicon synthetic leather according to claim 1, wherein a mass fraction of vinyl groups in the spherical vinyl MQ silicon resin is 0.1% to 10%, or/and
a mass fraction of vinyl groups in the vinyl MTQ silicon resin is 0.1% to 10%, or/and
a mass fraction of vinyl groups in the organopolysiloxane is 0.02% to 0.3%, or/and
a mass fraction of hydrogen atoms directly bonded to silicon atoms in the organic hydrogenated polysiloxane is 0.1% to 1.6%.

6. The organosilicon synthetic leather according to claim 5, wherein the mass fraction of vinyl groups in the spherical vinyl MQ silicon resin is in a range from 1% to 4.5%, or/and
the mass fraction of vinyl groups in the vinyl MTQ silicon resin is in a range from 1% to 6%, or/and
the mass fraction of vinyl groups in the organopolysiloxane is in a range from 0.06% to 0.25%, or/and
the mass fraction of hydrogen atoms directly bonded to silicon atoms in the organic hydrogenated polysiloxane is in a range from 0.5% to 1.2%.

7. The organosilicon synthetic leather according to claim 1, wherein the spherical vinyl MQ silicon resin has a particle diameter ranging from 1 μm to 10 μm.

8. The organosilicon synthetic leather according to claim 1, wherein the organopolysiloxane has an average composition formula (3) as follows:

$$R^6_a SiO_{(4-a)/2} \quad (3)$$

wherein $R^6$ is a substituted or unsubstituted monovalent hydrocarbyl group which is the same or different from each other and is directly bonded to a silicon atom, and a satisfies $1.5 \leq a \leq 2.8$, and
the organopolysiloxane has a viscosity ranging from 500 mPa·s to 500,000 mPa·s at 25° C.

9. The organosilicon synthetic leather according to claim 1, wherein the organic hydrogenated polysiloxane has a viscosity ranging from 1 mPa·s to 1,000 mPa·s at 25° C., or/and
an amount of Pt atoms in the platinum catalyst is 1,000 ppm to 20,000 ppm, and the platinum catalyst is at least one selected from the group consisting of platinum black, platinum-loaded silica, platinum-loaded alumina, platinum-loaded carbon black, chloroplatinic acid, a solution of chloroplatinic acid in isopropanol, a solution of chloroplatinic acid in ethanol, platinum-1,3 divinyltetramethyldisiloxane complex, a platinum-tetravinylcyclotetrasiloxane complex, and a platinum-enyne complex.

10. A method of preparing an organosilicon synthetic leather according to claim 1, comprising the steps of:
(1) uniformly mixing the raw materials of the surface glue layer according to claim 1 to obtain a surface glue;
(2) coating a release paper; performing heat curing to obtain a cured surface glue layer;
(3) uniformly mixing the raw materials of the bottom glue layer according claim 1 to obtain a bottom glue; and
(4) coating the cured surface glue layer with the bottom glue to form the bottom glue layer, compositing the bottom glue layer with a base layer; performing heat curing; striping the release paper to obtain the organosilicon synthetic leather.

11. The organosilicon synthetic leather according to claim 2, wherein a mass fraction of vinyl groups in the spherical vinyl MQ silicon resin is 0.1% to 10%, or/and
a mass fraction of vinyl groups in the vinyl MTQ silicon resin is 0.1% to 10%, or/and
a mass fraction of vinyl groups in the organopolysiloxane is 0.02% to 0.3%, or/and
a mass fraction of hydrogen atoms directly bonded to silicon atoms in the organic hydrogenated polysiloxane is 0.1% to 1.6%.

12. The organosilicon synthetic leather according to claim 3, wherein a mass fraction of vinyl groups in the spherical vinyl MQ silicon resin is 0.1% to 10%, or/and
a mass fraction of vinyl groups in the vinyl MTQ silicon resin is 0.1% to 10%, or/and
a mass fraction of vinyl groups in the organopolysiloxane is 0.02% to 0.3%, or/and
a mass fraction of hydrogen atoms directly bonded to silicon atoms in the organic hydrogenated polysiloxane is 0.1% to 1.6%.

13. The organosilicon synthetic leather according to claim 2, wherein the spherical vinyl MQ silicon resin has a particle diameter ranging from 1 to 10 μm.

14. The organosilicon synthetic leather according to claim 3, wherein the spherical vinyl MQ silicon resin has a particle diameter ranging from 1 to 10 μm.

15. The organosilicon synthetic leather according to claim 2, wherein the organopolysiloxane has an average composition formula (3) as follows:

$$R^6_a SiO_{(4-a)/2} \quad (3)$$

wherein $R^6$ is a substituted or unsubstituted monovalent hydrocarbyl group which is the same or different from each other and is directly bonded to a silicon atom, and a satisfies $1.5 \leq a \leq 2.8$, and
the organopolysiloxane has a viscosity ranging from 500 mPa·s to 500,000 mPa·s at 25° C.

16. The organosilicon synthetic leather according to claim 3, wherein the organopolysiloxane has an average composition formula (3) as follows:

$$R^6_a SiO_{(4-a)/2} \quad (3)$$

wherein $R^6$ is a substituted or unsubstituted monovalent hydrocarbyl group which is the same or different from each other and is directly bonded to a silicon atom, and a satisfies $1.5 \leq a \leq 2.8$, and
the organopolysiloxane has a viscosity ranging from 500 mPa·s to 500,000 mPa·s at 25° C.

17. The organosilicon synthetic leather according to claim 2, wherein the organic hydrogenated polysiloxane has a viscosity ranging from 1 mPa·s to 1,000 mPa·s at 25° C., or/and
an amount of Pt atoms in the platinum catalyst is 1,000 ppm to 20,000 ppm, and the platinum catalyst is at least one selected from the group consisting of platinum black, platinum-loaded silica, platinum-loaded alumina, platinum-loaded carbon black, chloroplatinic acid, a solution of chloroplatinic acid in isopropanol, a solution of chloroplatinic acid in ethanol, platinum-1,3 divinyltetramethyldisiloxane complex, a platinum-tetravinylcyclotetrasiloxane complex, and a platinum-enyne complex.

18. The organosilicon synthetic leather according to claim 3, wherein the organic hydrogenated polysiloxane has a viscosity ranging from 1 mPa·s to 1,000 mPa·s at 25° C., or/and
an amount of Pt atoms in the platinum catalyst is 1,000 ppm to 20,000 ppm, and the platinum catalyst is at least one selected from the group consisting of platinum black, platinum-loaded silica, platinum-loaded alumina, platinum-loaded carbon black, chloroplatinic acid, a solution of chloroplatinic acid in isopropanol, a solution of chloroplatinic acid in ethanol, platinum-1,3 divinyltetramethyldisiloxane complex, a platinum-tetravinylcyclotetrasiloxane complex, and a platinum-enyne complex.

19. A method of preparing an organosilicon synthetic leather according to claim 2, comprising the steps of:
(1) uniformly mixing the raw materials of the surface glue layer according to claim 2 to obtain a surface glue;
(2) coating a release paper; performing heat curing to obtain a cured surface glue layer;
(3) uniformly mixing the raw materials of the bottom glue layer according to claim 2 to obtain a bottom glue; and
(4) coating the cured surface glue layer with the bottom glue to form the bottom glue layer, compositing the bottom glue layer with a base layer; performing heat curing; striping the release paper to obtain the organosilicon synthetic leather.

20. A method of preparing an organosilicon synthetic leather according to claim 3, comprising the steps of:
(1) uniformly mixing the raw materials of the surface glue layer according claim 3 to obtain a surface glue;
(2) coating a release paper; performing heat curing to obtain a cured surface glue layer;
(3) uniformly mixing the raw materials of the bottom glue layer according to claim 3 to obtain a bottom glue; and
(4) coating the cured surface glue layer with the bottom glue to form the bottom glue layer, compositing the bottom glue layer with a base layer; performing heat curing; striping the release paper to obtain the organosilicon synthetic leather.

* * * * *